United States Patent Office 3,465,028
Patented Sept. 2, 1969

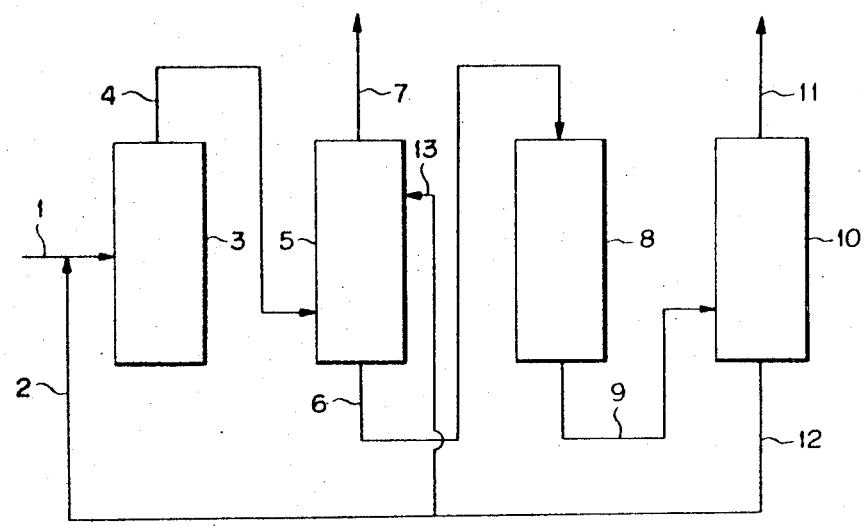

3,465,028
PROCESS FOR PREPARING UNSATURATED
ALIPHATIC NITRILES
Naoya Kominami, Tokyo, Hitoshi Nakajima, Urawa, Saitama, and Itaru Watanabe, Takeo Kimura, and Tokio Sakurai, Tokyo, Japan, assignors to Asahi Kasei Kogyo Kabushiki Kaisha, Osaka, Japan
Filed Apr. 3, 1967, Ser. No. 627,994
Claims priority, application Japan, Apr. 19, 1966, 41/24,361; Mar. 3, 1967, 42/13,148
Int. Cl. C07c 121/04, 121/16
U.S. Cl. 260—465.3         8 Claims

ABSTRACT OF THE DISCLOSURE

A process for preparing unsaturated aliphatic nitriles in a high yield and free from any disadvantage accompanied by the use of hydrogen halide while maintaining a high catalyst activity for a prolonged period of time, which process comprises bringing a gaseous mixture consisting of olefinic hydrocarbon, hydrogen cyanide and oxygen or an oxygen-containing gas into contact with a catalyst in the presence of halogenated aliphatic nitriles or a gaseous mixture of the halogenated aliphatic nitriles and hydrogen halide.

BACKGROUND OF THE INVENTION

Field of the invention

This invention relates to a process for producing unsaturated aliphatic nitriles by subjecting a gaseous mixture of olefinic hydrocarbon, hydrogen cyanide and oxygen to a gas phase catalytic reaction in the presence of halogenated aliphatic nitriles.

Description of the prior art

A British patent teaches a process for producing unsaturated aliphatic nitriles directly in one stage by subjecting a gaseous mixture of olefinic hydrocarbon, hydrogen cyanide and oxygen to a gas phase catalytic reaction.

We have also invented a process for producing unsaturated aliphatic nitriles by subjecting a gaseous mixture containing olefinic hydrocarbon, hydrogen cyanide and oxygen to a catalytic reaction in the presence of hydrogen halide under heating.

In accordance with our invention mentioned above, lower aliphatic nitriles may be obtained in a high yield while maintaining a high catalyst activity for a prolonged period of time by bringing a gaseous mixture of lower olefinic hydrocarbon, hydrogen cyanide and oxygen into contact with various catalysts, particularly palladium, in the presence of hydrogen halide.

In the process mentioned above, since hydrogen halide per se does not participate in the reaction and remains unchanged, it may be recovered from the reaction product, i.e. a mixture of unsaturated aliphatic nitriles and hydrogen halide by any conventional methods and it may be recycled to the reaction system and reused.

However, hydrogen halide is extremely corrosive to various metals as is known well, and there is a possibility in this process that hydrogen halide may corrode not only the reactor and recovery units but also it may flow into nitrile purifying unit and hydrogen halide recycle line and corrode metallic parts of these equipments.

It is readily appreciated that it gives great disadvantage from the standpoint of selecting materials for these equipments.

Moreover, when hydrogen halide is present together with unsaturated aliphatic nitriles in a liquid phase, halogenated aliphatic nitriles are produced as a result of the addition reaction of the former to the latter. Although the rate of the reaction depends upon the type of solvent used and the reaction conditions employed, anyhow, the loss of unsaturated aliphatic nitriles and hydrogen halide is almost inevitable.

SUMMARY OF THE INVENTION

This invention relates to a novel process for producing unsaturated aliphatic nitriles from olefinic hydrocarbon, hydrogen cyanide and oxygen without accompanying any disadvantage due to the presence of hydrogen halide mentioned above.

We have found that unsaturated aliphatic nitriles may be produced in a high yield and free from any disadvantage accompanied by the use of hydrogen halide while maintaining a high catalyst activity for a prolonged period of time by substituting halogenated aliphatic nitriles for hydrogen halide in the above-mentioned process.

That is, in accordance with the process of this invention, unsaturated aliphatic nitriles may be produced by bringing a gaseous mixture consisting of olefinic hydrocarbon, hydrogen cyanide and oxygen or an oxygen-containing gas into contact with a catalyst in a reactor while feeding halogenated aliphatic nitriles or a gaseous mixture of the halogenated aliphatic nitriles and hydrogen halide thereto simultaneously.

According to the process of this invention, halogenated aliphatic nitriles used are partly or wholly converted into unsaturated aliphatic nitriles and hydrogen halide in the reaction zone. After the completion of the formation of unsaturated aliphatic nitriles, hydrogen halide thus produced may be subjected to an addition reaction thereof with unsaturated aliphatic nitriles in a liquid phase to give halogenated aliphatic nitriles which may be recycled to the reactor and reused.

In the process of this invention, the presence of highly corrosive hydrogen halide is restricted only to the reaction zone in which unsaturated nitrile is produced and absorption zone in which the reaction products are absorbed or the addition reaction zone in which halogenated aliphatic nitrile is produced from unsaturated nitrile and hydrogen halide. Thus, the purifying zone in which unsaturated aliphatic nitrile is purified and the recycle line connected to the reaction zone wherein unsaturated nitrile is produced are freed from hydrogen halide, or, even if it is present, the concentration is greatly reduced. Hence, the selection of materials constituting the reaction equipment is quite easy.

Furthermore, in accordance with the process of this invention, halogenated aliphatic nitriles may be used quite efficiently by recycling the same to the reaction zone wherein unsaturated aliphatic nitrile is produced.

Halogenated aliphatic nitriles which may be used in the process of this invention include $\beta$-halogenated propionitrile, $\beta$-halogenated isobutyronitrile, $\beta$-halogenated butyronitrile, 1-halo-2-cyanobutane, 1-cyano-2-halobutane, 2-halo-3-cyanobutane and $\beta$-methyl-$\beta$-halobutyro nitrile. As halogens contained in these compounds, chlorine, bromine and iodine are preferable. More specifically, when using ethylene as an olefinic hydrocarbon, $\beta$-halogenated propionitrile is preferred, and if propylene is used, $\beta$-halogenated isobutyronitrile and $\beta$-halogenated butyronitrile are preferable. When using n-butylene, 1-halo-2-cyanobutane, 1-cyano-2-halobutane and 2-halo-3-cyanobutane are preferable, and if isobutylene is use, β-methyl-β-halobutyronitrile is preferred.

These halogenated aliphatic nitriles exemplified above may be fed to the reaction system either in the form of liquid or gas. Alternatively, these halogenated aliphatic nitriles may be fed after partly or wholly decomposing the same into unsaturated aliphatic nitriles and hydrogen halide in a suitable manner.

In decomposing halogenated aliphatic nitriles partly or wholly beforehand, it is necessary to heat them in the presence of a catalyst.

Catalysts which may be used in this reaction include at least a member selected from the group consisting of alumina, silica, active carbon, silica-alumina, boria; halides of alkali metals, alkaline earth metals, zinc or cadmium or salts of oxyacids such as sulfates and phosphates; and elementary metals and halides of noble metals of Group VIII such as palladium and platinum. It is desirable that the catalyst may have a larger surface area.

In practising the catalytic decomposition reaction mentioned above, a reaction temperature of from 150° to 600° C., and most preferably from 200° to 450° C., is employed.

Although the reaction is usually conducted at a normal pressure, it may be conducted either at an elevated or a reduced pressure.

The space velocity of halogenated aliphatic nitriles fed is preferably from 20 hr.$^{-1}$ to 40,000 hr.$^{-1}$.

Catalysts which may be used in the process for producing unsaturated aliphatic nitriles from olefinic hydrocarbon, hydrogen cyanide and oxygen according to this invention include metallic palladium and palladium compounds. Although it is desirable to incorporate at least a compound of lithium, sodium, potassium, rubidium, cesium, magnesium, calcium, strontium, barium, indium, thallium, antimony, bismuth, zinc, cadmium and cerium into the catalyst mentioned above, if desired, it is not essential.

Palladium compounds mentioned above include halides, cyanides, inorganic oxyacid salts such as nitrates, sulfate and the like; organic oxyacid salts such as acetates, monochloroacetates and the like; and hydroxides of palladium.

Compounds of lithium, sodium, potassium, rubidium, cesium, magnesium, calcium, strontium, barium, indium, thallium, antimony, bismuth, zinc, cadmium and cerium mentioned above include halides, inorganic oxyacid salts such as sulfates, nitrates and phosphates, organic acid salts such as citrates and the like, cyanides, hydroxides and oxides of these metals.

In preparing the catalyst for use in the process of this invention, any of the conventional mixing or immersion methods may be conveniently used and the use of carriers is preferable, though it is not essential.

Any of the conventional carriers usually used for supporting catalysts may be conveniently used. However, carriers having relatively larger surface areas, for example, active carbon, silica, alumina, silica-alumina and the like, are preferable.

Olefinic hydrocarbons which may be used in the process of this invention include, for example, ethylene, propylene, n-butylene, isobutylene and the like.

In the process of this invention, ethylene produces acrylonitrile as a product, and propylene, n-butylene and isobutylene give methacrylonitrile and crotononitrile; α,β-dimethylacrylonitrile, α-ethylacrylonitrile and β-ethylacrylonitrile; and β,β-dimethylacrylonitrile, respectively.

In practising the process of this invention, the composition of the agseous mixture used as a feed gas is such that hydrogen cyanide is preferably in a range of 1/20 to 20 parts by volume per part by volume of olefinic hydrocarbons, oxygen is preferably less than one part by volume per part by volume of the sum of hydrogen cyanide and olefinic hydrocarbons, and halogenated aliphatic nitrile is preferably in a range of 1/100 to 20 parts by volume per part by volume of hydrogen cyanide. If hydrogen halide is used together with halogenated aliphatic nitriles, the amount of gaseous hydrogen halide is preferably less than 20 parts by volume per part by volume of gaseous hydrogen cyanide.

In carrying out the process of this invention, a reaction temperature of from 100° to 500° C., and most preferably from 200° to 450° C., is employed.

The reaction may be conducted either at a normal pressure or an elevated pressure.

The preferable space velocity in the process of this invention ranges from 20 hr.$^{-1}$ to 20,000 hr.$^{-1}$.

Any of the reaction modes such as fixed bed, moving bed or fluidized bed may be conveniently employed in the process of this invention.

In conducting the process of this invention, any of the conventional solvents known as an absorption medium may be readily used for absorbing the reaction mixture. However, water, water containing hydrogen halide and/or unsaturated aliphatic nitriles, saturated aliphatic nitriles and halogenated aliphatic nitriles are preferable.

The feature of these absorption media resides in that they readily absorb hydrogen halide and unsaturated aliphatic nitriles contained in the gaseous mixture discharged from the reaction zone in which unsaturated aliphatic nitriles are produced, and furthermore, facilitate the reaction of hydrogen halide absorbed with unsaturated aliphatic nitriles to form halogenated aliphatic nitriles in the addition reaction tower.

The water containing hydrogen halide and/or unsaturated aliphatic nitriles mentioned above may either be a part of an effluent discharged from the absorption tower, or, a distillate from the purification zone of crude unsaturated aliphatic nitriles.

Saturated aliphatic nitriles or halogenated aliphatic nitriles which are used as absorption media in the process of this invention may contain such impurities as water, etc., which do not adversely affect the process of this invention.

The addition reaction zone in which hydrogen halide is reacted with unsaturated aliphatic nitriles to form halogenated aliphatic nitriles may either be an empty tower of a tower filled with various conventional fillers. Such fillers may be made of porcelain, glass, stainless steel and the like.

The temperature of the addition reaction zone in which hydrogen halide is reacted with unsaturated aliphatic nitriles is preferably from room temperature to 150° C. The reaction pressure may either be a normal pressure or an elevated pressure. The residence time of the reactants is less than 5 hours and, in general, less than an hour should be sufficient.

BRIEF DESCRIPTION OF THE DRAWING

The process of this invention will be explained more fully hereinafter by making reference to the accompanying drawing which illustrates a flow diagram of the process of this invention.

Numeral 3 designates a reaction zone in which unsaturated aliphatic nitriles are produced from olefinic hydrocarbon, hydrogen cyanide and oxygen. There are introduced to said reaction zone 3 olefinic hydrocarbons, hydrogen cyanide and oxygen via line 1, and halogenated aliphatic nitriles via line 2. A gaseous mixture discharged from outlet 4 of said reaction zone 3 contains steam, carbon monoxide, carbon dioxide, nitrogen, unreacted olefinic hydrocarbons, and usually a small amount of hydrogen cyanide in addition to unsaturated aliphatic nitriles. Said gaseous mixture containing these ingredients as mentioned above discharged from the reaction 3 is then introduced to an absorption tower 5 wherein soluble materials are absorbed by an absorption medium and the separated gaseous mixture of olefinic hydrocarbon, oxygen, carbon monoxide, carbon dioxide, and nitrogen are discharged from the top 7 of the absorption tower 5. Said gaseous mixture thus discharged therefrom contains no or very little hydrogen halide which is highly corrosive. If required, olefinic hydrocarbons may be recovered therefrom by any conventional methods and they may be recycled to the reaction zone 3 and reused. On the other hand, from the bottom 6 of the absorption tower 5 is obtained a mixture containing unsaturated aliphatic nitriles, hydrogen halide, halogenated aliphatic nitriles and absorption medium, and it is introduced to an addition reaction zone 8 in which hydrogen halide is reacted with unsaturated aliphatic nitriles to form halogenated aliphatic nitriles. The temperature of the absorption tower 5 is preferably below 50° C. under a normal pressure. It is also possible to operate the same at above 50° C. under an elevated pressure.

The mixture containing hydrogen halide fed to the reaction zone 8 is then subjected to the reaction at a temperature of from room temperature to 150° C. thereby converting hydrogen halide nearly completely, or, at least predominantly, to halogenated aliphatic nitriles.

The effluent discharged from the addition reaction zone 8 contains unsaturated aliphatic nitriles, halogenated aliphatic nitriles and, in addition, absorption medium, but, it is substantially free from highly corrosive hydrogen halide.

The effluent from the addition reaction zone 8 is fed to unsaturated aliphatic nitrile recovering unit 10 via line 9 to obtain unsaturated aliphatic nitriles from the top 11 and halogenated aliphatic nitriles from the bottom 12 thereof. Halogenated aliphatic nitriles thus recovered may be recycled to the reaction zone 3 via line 2 and, if desired, to the absorption tower 5 via line 13 for reuse.

DESCRIPTION OF THE PREFERRED EMBODIMENTS

The following examples will illustrate this invention more fully. However, it should not be construed that these examples restrict this invention as they are given merely by way of illustration.

EXAMPLE 1

Through a Pyrex glass tube of 12 mm. diameter containing a mixture of 4 ml. of a catalyst composition comprising palladium, potassium iodide and silica gel and 6 ml. of quartz sand, which was placed in a nitre bath heated at 330° C., was passed a gaseous mixture consisting of ethylene, hydrogen cyanide, oxygen, β-chloropropionitrile and nitrogen in a volume ratio of 50:10:10:5:28 at a flow rate of 103 ml./min.

The yield of acrylonitrile was calculated as 70 mol percent on the basis of hydrogen cyanide supplied, by deducting the amount of acrylonitrile produced in the catalytic decomposition of β-chloropropionitrile from the total amount of acrylonitrile obtained.

EXAMPLE 2

To 6 ml. of a catalyst composition comprising palladium and active carbon maintained at 310° C. was fed a gaseous mixture consisting of ethylene, hydrogen cyanide, oxygen, β-bromopropionitrile, and nitrogen in a volume ratio of 50:10:8:3:28 at a flow rate of 99 ml./min.

The yield of acrylonitrile was calculated as 65 mol percent on the basis of hydrogen cyanide supplied, by deducting the amount of acrylonitrile produced in the catalytic decomposition of β-bromopropionitrile from the total amount of acrylonitrile obtained.

EXAMPLE 3

Through a glass tube containing 4 ml. of active alumina and 4 ml. of catalyst composition comprising palladium chloride, potassium iodide and silica gel, which was maintained at 330° C., was passed a gaseous mixture consisting of ethylene, hydrogen cyanide, oxygen, β-iodopropionitrile, ethane, carbon dioxide and nitrogen in a volume ratio of 30:20:10:10:1:2:77 at a flow rate of 100 ml./min.

The yield of acrylonitrile was calculated as 27 mol percent on the basis of hydrogen cyanide supplied, by deducting the amount of acrylonitrile produced in the catalytic decomposition of β-iodopropionitrile from the total amount of acrylonitrile obtained.

EXAMPLE 4

To 10 ml. of a catalyst composition comprising palladium chloride, cadmium chloride and active carbon maintained at 320° C. was fed a gaseous mixture consisting of ethylene, hydrogen cyanide, oxygen, β-chloropropionitrile, and nitrogen in a volume ratio of 30:10:10:5:24 at a flow rate of 100 ml./min.

The yield of acrylonitrile was calculated as 41 mol percent on the basis of hydrogen cyanide supplied, by deducting the amount of acrylonitrile produced in the catalytic decomposition of β-chloropropionitrile from the total amount of acrylonitrile obtained.

EXAMPLE 5

To 8 ml. of a catalyst composition comprising palladium chloride, calcium chloride and silica gel maintained at 330° C. was fed a gaseous mixture consisting of ethylene, hydrogen cyanide, oxygen, β-chloropropionitrile and nitrogen in a volume ratio of 40:7:5:5:43 at a flow rate of 100 ml./min.

The yield of acrylonitrile was calculated as 71 mol percent on the basis of hydrogen cyanide supplied, by deducting the amount of acrylonitrile produced in the catalytic decomposition of β-chloropropionitrile from the total amount of acrylonitrile obtained.

EXAMPLE 6

To 4 ml. of a catalyst composition comprising palladium acetate, sodium acetate and silica gel maintained at 310° C. was fed a gaseous mixture consisting of ethylene, hydrogen cyanide, oxygen, β-chloropropionitrile and nitrogen in a volume ratio of 12:12:10:5:61 at a flow rate of 100 ml./min.

The yield of acrylonitrile was calculated as 30 mol percent on the basis of hydrogen cyanide supplied by deducting the amount of acrylonitrile produced in the catalytic decomposition of β-chloropropionitrile from the total amount of acrylonitrile obtained.

EXAMPLE 7

To 5 ml. of a catalyst composition comprising palladium chloride, thallium chloride and silica gel maintained at 300° C. was fed a gaseous mixture consisting of ethylene, hydrogen cyanide, oxygen, β-chloropropionitrile and nitrogen in a volume ratio of 30:10:8:10:52 at a flow rate of 100 ml./min.

The yield of acrylonitrile was calculated as 41 mol percent on the basis of hydrogen cyanide supplied, by deducting the amount of acrylonitrile produced in the catalytic decomposition of β-chloropropionitrile from the total amount of acrylonitrile obtained.

EXAMPLE 8

To 8 ml. of a catalyst composition comprising palladium chloride, bismuth chloride and silica gel maintained at 300° C. was fed a gaseous mixture consisting of ethylene, hydrogen cyanide, oxygen, β-chloropropionitrile and nitrogen in a volume ratio of 50:10:10:8:32 at a flow rate of 110 ml./min.

The yield of acrylonitrile was calculated as 32 mol percent on the basis of hydrogen cyanide supplied, by deducting the amount of acrylonitrile produced in the catalytic decomposition of β-chloropropionitrile from the total amount of acrylonitrile obtained.

EXAMPLES 9–12

The following Table 1 shows results obtained with the use of various catalyst compositions as specified therein. Reaction conditions were substantially the same as specified in Example 8 except that the reaction temperatures and the flow rates of β-chloropropionitrile were altered as specified in the Table 1:

TABLE 1

| Example No. | Catalyst compositions | Reaction temperature, °C. | Flow rate of β-chloropropionitrile | Yield of acrylonitrile,* mol percent |
| --- | --- | --- | --- | --- |
| 9 | Palladium chloride-barium chloride-silica gel. | 320 | 5 | 47 |
| 10 | Palladium bromide-cesium bromide-silica gel. | 300 | 5 | 51 |
| 11 | Palladium sulfate-zinc sulfate-silica gel. | 300 | 5 | 20 |
| 12 | Palladium chloride-indium chloride-silica gel. | 330 | 5 | 29 |

*One-pass yield of acrylonitrile based on hydrogen cyanide supplied which was calculated by deducting the amount of acrylonitrile produced in the catalytic decomposition of β-chloropropionitrile from the total amount of acrylonitrile obtained.

EXAMPLE 13

To 8 ml. of a catalyst composition comprising palladium chloride, potassium chloride and silica gel maintained at 345° C. was fed a gaseous mixture consisting of propylene, hydrogen cyanide, oxygen, β-chloroisobutyronitrile and nitrogen in a volume ratio of 50:10:10:4:45 at a flow rate of 110 ml./min.

The yields of methacrylonitrile and crotonitrile thus produced were calculated as 13 mol percent and 14 mol percent, respectively, on the basis of hydrogen cyanide supplied, by deducting the amount of nitriles produced in the catalytic decomposition of β-chloroisobutyronitrile from the total amount of nitriles obtained.

EXAMPLE 14

To 8 ml. of a catalyst composition comprising palladium iodide, potassium iodide and silica gel maintained at 345° C. was fed a gaseous mixture consisting of propylene, hydrogen cyanide, oxygen, β-bromoisobutyronitrile and nitrogen in a volume ratio of 50:10:7:4:29 at a flow rate of 100 ml./min.

The yields of methacrylonitrile and crotononitrile thus produced were calculated as 9 mol percent and 11 mol percent, respectively, on the basis of hydrogen cyanide supplied, by deducting the amount of nitriles produced in the catalytic decomposition of β-bromoisobutyronitrile from the total amount of nitriles obtained.

EXAMPLE 15

To 8 ml. of a catalyst composition comprising palladium cyanide, potassium cyanide and silica gel maintained at 355° C. was fed a gaseous mixture consisting of propylene, hydrogen cyanide, oxygen, β-iodoisobutyronitrile and nitrogen in a volume ratio of 50:8:8:4:30 at a flow rate of 100 ml./min.

The yields of methacrylonitrile and crotononitrile thus produced were calculated at 13 mol percent and 15 mol percent, respectively, on the basis of hydrogen cyanide supplied, by deducting the amount of nitriles produced in the catalytic decomposition of β-iodoisobutyronitrile from the total amount of nitriles obtained.

EXAMPLE 16

To a mixture of 4 ml. of catalyst comprising palladium, potassium iodide and silica gel and 8 ml. of quartz sand maintained at 330° C. was fed a gaseous mixture consisting of ethylene, hydrogen cyanide, oxygen, β-chloropropionitrile, hydrogen chloride and nitrogen in a volume ratio of 50:10:10:3:3:27 at a flow rate of 103 ml./min.

The yield of acrylonitrile was calculated as 78 mol percent on the basis of hydrogen cyanide supplied, by deducting the amount of acrylonitrile produced in the catalytic decomposition of β-chloropropionitrile from the total amount of acrylonitrile obtained.

EXAMPLE 17

To 6 ml. of a catalyst composition comprising palladium chloride and active charcoal maintained at 310° C. was fed a gaseous mixture consisting of ethylene, hydrogen cyanide, oxygen, β-chloropropionitrile and nitrogen in a volume ratio of 50:10:8:3:28 at a flow rate of 99 ml./min.

The yield of acrylonitrile was calculated as 65 mol percent on the basis of hydrogen cyanide supplied, by deducting the amount of acrylonitrile produced in the catalytic decomposition of β-chloropropionitrile from the total amount of acrylonitrile obtained.

EXAMPLE 18

To 8 ml. of a catalyst composition comprising palladium chloride, potassium iodide and silica gel maintained at 400° C. was fed a gaseous mixture consisting of propylene, hydrogen cyanide, air and β-chlorobutyronitrile in a volume ratio of 7:1:7:2 at a flow rate of 80 ml./min.

The yields of methacrylonitrile and crotononitrile thus produced were calculated as 24.6% and 26.4%, respectively, on the basis of hydrogen cyanide supplied, by deducting the amount of crotononitrile produced in the catalytic decomposition of β-chlorobutyronitrile from the total amount of nitriles obtained.

EXAMPLE 19

To 4 ml. of a catalyst composition comprising palladium chloride, cesium chloride and silica gel maintained at 380° C. was fed a gaseous mixture consisting of n-butylene, hydrogen cyanide, oxygen, nitrogen and a mixture of 1-chloro-2-cyanobutane, 1-cyano-2-chlorobutane and 2-chloro-3-cyanobutane in a volume ratio of 2:1:1:5:1 at a flow rate of 100 ml./min.

The yields of ethylacrylonitrile and α,β-dimethylacrylonitrile were calculated as 27.6% and 15.3%, respectively, on the basis of hydrogen cyanide supplied, by deducting the amounts of α-ethylacrylonitrile, β-ethylacrylonitrile and α,β-dimethylacrylonitrile produced in the catalytic decomposition of 1-chloro-2-cyanobutane, 1-cyano-2-chlorobutane and 2-chloro-3-cyanobutane from the total amount of nitriles obtained.

EXAMPLE 20

To 8 ml. of a catalyst composition comprising paladium chloride, cadmium chloride, sodium chloride and silica gel maintained at 350° C. was fed a gaseous mixture consisting of isobutylene, hydrogen cyanide, air and β-chlorobutyronitrile in a volume ratio of 3:1:5:2 at a flow rate of 50 ml./min.

The yield of β,β-dimethylacryonitrile was calculated as 30.0% on the basis of hydrogen cyanide supplied, by deducting the amount of β,β-dimethylacrylonitrile produced in the catalytic decomposition of β-chlorobutyronitrile from the total amount of β,β-dimethylacrylonitrile obtained.

EXAMPLE 21

Referring to the accompanying drawing, to the reaction zone 3 where fed 401.7 mols of ethylene, 40.7 mols of hydrogen cyanide, 40.6 mols of oxygen and 1.5 mols of hydrogen chloride via line 1 and 18.0 moles of β-chloropropionitrile via line 2, and the reaction was conducted therein under the reaction conditions including a temperature of 350° C. and a space velocity of 500 hr.$^{-1}$ in the presence of a catalyst composition comprising palladium chloride, cesium chloride and silica gel.

The composition of gaseous mixture discharged from the reaction zone 3 was 355 mols of ethylene, 4.3 mols of oxygen, 11.1 mols of hydrogen chloride, 8.4 mols of β-chloropropionitrile, 50.3 mols of acrylonitrile, 4.0 mols of carbon monoxide, 8.0 mols of carbon dioxide and 52.7 mols of steam.

Said gaseous mixture was then fed to the absorption tower 5 via line 4 and β-chloropropionitrile was absorbed therein.

The composition of the discharged gas at the outlet 7 of the absorption tower 5 was 355 mols of ethylene, 4.3 mols of oxygen, 4.0 mols of carbon monoxide, and 8.0 mols of carbon dioxide. In addition, water was discharged therefrom but no hydrogen chloride was observed. The effluent from the bottom 6 of the absorption tower was β-chloropropionitrile solution containing 11.1 mols of hydrogen chloride, 50.3 mols of acrylonitrile and water.

The effluent was subsequently introduced to the addition reaction zone 8 and the reaction was conducted at a temperature of 80° C. for the residence time of 40 minutes. At the end of the period, the reaction mixture was taken out and analyzed to show no content of hydrogen chloride. The effluent from the reaction zone 8 was then fed to the recovery unit 10 and 49.1 mols of acrylonitrile was obtained from the top thereof.

EXAMPLE 22

A gaseous mixture of 5% by volume of β-chloropropionitrile and nitrogen was passed through a reactor filled with 4 ml. of active charcoal catalyst maintained at 330° C. at a space velocity of 1500 hr.$^{-1}$.

Acrylonitrile was produced in a yield of 92 mol percent on the basis of β-chloropropionitrile supplied. Said yield was calculated from analysis values of gaseous mixture discharged from the reactor by gas chromatography.

EXAMPLE 23

Example 22 was repeated except that 4 ml. of silica gel was used as a catalyst in place of active charcoal.

Acrylonitrile was produced in a yield of 81 mol percent on the basis of β-chloropropionitrile supplied.

EXAMPLE 24

Example 22 was repeated except that 4 ml. of active alumina was used as a catalyst and a reaction temperature was 360° C.

Acrylonitrile was produced in a yield of 88 mol percent on the basis of β-chloropropionitrile supplied.

EXAMPLE 25

A catalyst composition comprising palladium chloride, potassium iodide and silica gel was prepared by dissolving 0.1 g.-mol of palladium chloride into aqueous hydrochloric acid solution, adding 1 liter of silica gel to the resulting solution, drying the resulting mixture on the water bath to dryness, adding the dried mixture of palladium chloride and silica gel to an aqueous potassium iodide solution containing 0.2 g.-mol of potassium iodide per liter of silica gel, and again drying the resulting mixture to dryness.

The reaction was carried out in the same reaction conditions as those in Example 22 except that 4 ml. of the catalyst composition thus obtained was used as a catalyst.

Acrylonitrile was produced in a yield of 95 mol percent on the basis of β-chloropropionitrile supplied.

EXAMPLE 26

A gaseous mixture consisting of β-bromopropionitrile, ethylene, ethane, hydrogen cyanide, propionitrile and acrylonitrile in a volume ratio of 3:50:15:2:20:10 was passed through 3 ml. of catalyst composition consisting of 0.1 g.-mol/l. of potassium bromide and alumina maintained at 330° C. at a space velocity of 2700 hr.$^{-1}$. As a result, 96% of β-propionitrile supplied was decomposed.

EXAMPLE 27

A gaseous mixture consisting of β-iodopropionitrile, nitrogen, carbon dioxide, carbon monoxide and steam in a volume ratio of 3:80:13:3:1 was passed through 3 ml. of catalyst composition consisting of 0.02 g.-mol/l. of platinum and silica gel maintained at 330° C. at a space velocity of 2700 hr.$^{-1}$.

Acrylonitrile was produced in a yield of 85 mol percent on the basis of β-iodopropionitrile supplied.

EXAMPLE 28

A gaseous mixture consisting of 3% by volume of β-chloroisobutyronitrile and nitrogen was passed through 4 ml. of a catalyst composition consisting of 0.5 g.-mol/l. of sodium chloride and alumina maintained at 330° C. at a space of velocity of 1500 hr.$^{-1}$.

Methacrylonitrile was produced in a yield of 53 mol percent on the basis of β-chloroisobutyronitrile supplied.

EXAMPLE 29

A gaseous mixture consisting of 3% by volume of β-bromoisobutyronitrile and nitrogen was passed through 4 ml. of a catalyst composition consisting of 0.05 g.-mol/l. of sodium sulfate, 0.2 g.-mol/l. of sodium chloride and silica gel under the same conditions as those in Example 27.

Methacrylonitrile was produced in a yield of 59 mol percent on the basis of β-bromoisobutyronitrile supplied.

EXAMPLE 30

A gaseous mixture consisting of 3% by volume of β-iodoisobutyronitrile and nitrogen was passed through 5 ml. of a catalyst composition consisting of 0.1 g.-mol./l. of hydrogen calcium phosphate and silica gel under the same conditions as those in Example 27.

Methacrylonitrile was produced in a yield of 57 mol percent on the basis of β-iodoisobutyronitrile.

EXAMPLE 31

The following Table 2 shows the results obtained with the use of various catalyst compositions. The same reaction conditions as in Example 22 were employed:

TABLE 2

| Catalyst compositions: | Yield of acrylonitrile (mol percent based on β-chloropropionitrile fed) |
|---|---|
| Silica-alumina | 70 |
| Alumina-boria | 73 |
| Calcium chloride-alumina | 95 |
| Magnesium chloride-silica | 85 |
| Barium chloride-alumina | 91 |
| Strontium-chloride-alumina | 90 |
| Potassium iodide-silica | 91 |
| Zinc chloride-active carbon | 95 |
| Cadmium chloride-active carbon | 92 |
| Cesium chloride-alumina | 90 |

EXAMPLE 32

A gaseous mixture consisting of β-chloropropionitrile, ethylene, hydrogen cyanide, oxygen, hydrogen chloride and nitrogen in a volume ratio of 5:50:10:5:5:26 was passed through silica gel catalyst maintained at 315° C. at a space velocity of 3000 hr.$^{-1}$.

Acrylonitrile was produced in a yield of 51 mol percent on the basis of β-chloropropionitrile supplied.

EXAMPLE 33

To 5 ml. of a catalyst composition comprising palladium chloride, cesium bromide and silica gel maintained at 315° C. was fed a gaseous mixture consisting of ethylene, hydrogen cyanide, oxygen, β-chloropropionitrile, hydrogen chloride and nitrogen in a volume ratio 50:10:10:7:1:32 at a flow rate of 110 ml./min.

The yield of acrylonitrile was calculated as 72 mol percent on the basis of hydrogen cyanide supplied, by deducting the amount of acrylonitrile produced in the catalytic decomposition of β-chloropropionitrile from the total amount of acrylonitrile obtained.

EXAMPLE 34

A gaseous mixture consisting of ethylene, hydrogen cyanide, oxygen, β-chloropropionitrile and nitrogen in a volume ratio of 50:10:10:7:32 was passed through 4 ml. of silica gel maintained at 330° C. at a flow rate of 109 ml./min., and then, further passed through 10 ml. of a catalyst composition comprising palladium chloride, potassium iodide and silica gel maintained at 295° C.

The yield of acrylonitrile was calculated as 75 mol percent on the basis of hydrogen cyanide supplied, by deducting the amount of acrylonitrile produced by the catalytic decomposon of β-chloropropionitrile from the total amount of acrylonitrile obtained.

We claim:

1. Process for the production of unsaturated aliphatic nitriles selected from the group consisting of acrylonitrile, methacrylonitrile, crotononitrile, α,β-dimethylacrylonitrile, α-ethylacrylonitrile, β-ethylacrylonitrile and β,β-dimethylacrylonitrile, which comprises contacting a gaseous mixture consisting essentially of an olefinic hydrocarbon selected from the group consisting of ethylene, propylene, n-butylene and isobutylene, hydrogen cyanide and a gas selected from the group consisting of oxygen and a molecular oxygen-containing gas at a temperature of from 100° C. to 500° C. with a catalyst selected from the group consisting of palladium metal, chloride, bromide, iodide, hydroxide, cyanide, nitrate, sulfate, acetate and monochloroacetate while feeding thereto simultaneously a gas selected from the group consisting essentially of a halogenated aliphatic nitrile and a gaseous mixture of halogenated aliphatic nitrile and hydrogen halide and a gaseous mixture of halogenated aliphatic nitrile, unsaturated aliphatic nitrile and hydrogen halide, said halogenated aliphatic nitrile being selected from the group consisting of β-halogenated propionitrile, β-halogenated isobutyronitrile, β-halogenated butyronitrile, 1-halo-2-cyanobutane, 1-cyano-2-halo-butane, 2-halo-3-cyanobutane and β-methyl-β-halo-butyronitrile, said unsaturated aliphatic nitrile being selected from the group consisting of acrylonitrile, methacrylonitrile, crotononitrile, α,β-dimethylacrylonitrile, α-ethylacrylonitrile, β-ethylacrylonitrile and β,β-dimethylacrylonitrile, the halogen of said halogenated aliphatic nitrile and hydrogen halide being selected from the group consisting of chlorine, bromine and iodine and said halogenated aliphatic nitrile being used in an amount of from 1/100 to 20 parts by volume per part by volume of hydrogen cyanide and said hydrogen halide being used in an amount of less than 20 parts by volume per part by volume of hydrogen cyanide.

2. Process for the production of unsaturated aliphatic nitriles selected from the group consisting of acrylonitrile, methacrylonitrile, crotononitrile, α,β-dimethylacrylonitrile, α-ethylacrylonitrile, β-ethylacrylonitrile and β,β-dimethylacrylonitrile, which comprises contacting a gaseous mixture consisting essentially of an olefinic hydrocarbon selected from the group consisting of ethylene, propylene, n-butylene and isobutylene, hydrogen cyanide and a gas selected from the group consisting of oxygen and a molecular oxygen-containing gas at a temperature of from 100° C. to 500° C. with a catalyst selected from the group consisting of palladium metal, chloride, bromide, iodide, hydroxide, cyanide, nitrate, sulfate, acetate and monochloroacetate while feeding thereto simultaneously a gas selected from the group consisting essentially of a halogenated aliphatic nitrile, a gaseous mixture of halogenated aliphatic nitrile and hydrogen halide and a gaseous mixture of halogenated aliphatic nitrile, unsaturated aliphatic nitrile and hydrogen halide, said halogenated aliphatic nitrile being selected from the group consisting of β-halogenated propionitrile, β-halogenated isobutyronitrile, β-halogenated butyronitrile, 1-halo-2-cyanobutane, 1-cyano-2-halo-butane, 2-halo-3-cyanobutane and β-methyl-β-halo-butyronitrile, said unsaturated aliphatic nitrile being selected from the group consisting of acrylonitrile, methacrylonitrile, crotononitrile, α,β-dimethylacrylonitrile, α-ethylacrylonitrile, β-ethylacrylonitrile and β,β-dimethylacrylonitrile, the halogen of said halogenated aliphatic nitrile and hydrogen halide being selected from the group consisting of chlorine, bromine and iodine and said halogenated aliphatic nitrile being used in an amount of from 1/100 to 20 parts by volume per part by volume of hydrogen cyanide and said hydrogen halide being used in an amount of less than 20 parts by volume per part by volume of hydrogen cyanide; contacting the resulting gaseous mixture discharged from the reactor with a solvent selected from the group consisting of water, water containing at least one of hydrogen halide and unsaturated aliphatic nitriles, saturated aliphatic nitrile and halogenated aliphatic nitriles to dissolve hydrogen halide, halogenated aliphatic nitrile and unsaturated aliphatic nitrile therein, reacting the hydrogen halide with unsaturated aliphatic nitrile to form halogenated aliphatic nitrile and recycling the resulting halogenated aliphatic nitrile to the reaction system.

3. Process according to claim 1 wherein said olefinic hydrocarbon is ethylene and said halogenated aliphatic nitrile is β-halogenated propionitrile.

4. Process according to claim 1 wherein said olefinic hydrocarbon is propylene and said halogenated aliphatic nitrile is at least one member selected from the group consisting of β-halogenated butyronitrile and β-halogenated isobutyronitrile.

5. Process according to claim 1 wherein said olefinic hydrocarbon is n-butylene and said halogenated aliphatic nitrile is at least one member selected from the group consisting of 1-halo-2-cyanobutane, 1-cyano-2-halobutane and 2-halo-3-cyanobutane.

6. Process according to claim 1 wherein said olefinic hydrocarbon is isobutylene and said halogenated aliphatic nitrile is β-methyl-β-halobutyronitrile.

7. Process according to claim 1 wherein said halogenated aliphatic nitrile is subjected to catalytic decomposition beforehand at a temperature of 150 to 600° C. to form the hydrogen halide and unsaturated aliphatic nitrile in the presence of at least one member selected from the group consisting of alumina, silica, active carbon, silica-alumina, boria; halides and oxyacid salts of alkali metals, alkaline earth metals, zinc, and cadmium; and elementary metals and halides of noble metals of Group VIII of the Periodic Table.

8. A process according to claim 7 wherein the decomposition temperature is from 200–450° C.

References Cited

UNITED STATES PATENTS 3,347,900  10/1967  Gossel et al.

JOSEPH P. BRUST, Primary Examiner

U.S. Cl. X.R.

260—465.7, 465.9